(12) United States Patent
Kitajima et al.

(10) Patent No.: US 9,264,590 B2
(45) Date of Patent: Feb. 16, 2016

(54) HOLDING STRUCTURE FOR DISPLAY PANEL AND IMAGING DEVICE

(71) Applicant: Panasonic Corporation, Osaka (JP)

(72) Inventors: Norihito Kitajima, Osaka (JP); Masami Fukuhara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/247,656

(22) Filed: Apr. 8, 2014

(65) Prior Publication Data
US 2015/0042876 A1    Feb. 12, 2015

(30) Foreign Application Priority Data

Aug. 6, 2013 (JP) .................................. 2013-163014
Feb. 26, 2014 (JP) .................................. 2014-034989

(51) Int. Cl.
    *H04N 5/225*      (2006.01)
    *H04N 5/232*      (2006.01)

(52) U.S. Cl.
    CPC ......... *H04N 5/2252* (2013.01); *H04N 5/23293* (2013.01)

(58) Field of Classification Search
    CPC . G06F 1/168; G03B 2217/002; G03B 17/568
    See application file for complete search history.

(56) References Cited

U.S. PATENT DOCUMENTS

| | | | | |
|---|---|---|---|---|
| 7,626,654 B2* | 12/2009 | Tsubokura et al. | ............. | 349/60 |
| 8,290,359 B2* | 10/2012 | Kishida et al. | ................ | 396/374 |
| 2006/0068263 A1* | 3/2006 | Kim et al. | ........................ | 429/35 |
| 2011/0134346 A1* | 6/2011 | Hayashi et al. | ............... | 348/790 |

FOREIGN PATENT DOCUMENTS

JP      2002-108235 A      4/2002

* cited by examiner

*Primary Examiner* — Roberto Velez
*Assistant Examiner* — Angel L Garces-Rivera
(74) *Attorney, Agent, or Firm* — Renner, Otto, Boisselle & Sklar, LLP

(57) ABSTRACT

A holding structure for a display panel includes a case that has a substantially quadrangle-shaped opening, a plurality of elastic strips that is disposed to surround the periphery of the opening, the display panel that is disposed to close the opening via the plurality of elastic strips, and a holding plate that is disposed to press the display panel against the plurality of the elastic strips. The case has recesses in parts of the periphery of the opening. The plurality of the elastic strips is disposed such that each strip has a part overlapping with the corresponding part of another strip, one on another. The overlapping parts of the plurality of the elastic strips are configured to fill at least a part of the respective recesses.

12 Claims, 5 Drawing Sheets

HOLDING STRUCTURE FOR DISPLAY PANEL AND IMAGING DEVICE

BACKGROUND

Technology has been known which is employed to reduce foreign matters entering a space between a front panel and the front surface of a display panel (see Japanese Patent Unexamined Publication No. 2002-108235, for example).

SUMMARY

A holding structure for a display panel according to the present disclosure includes a case that has a substantially quadrangle-shaped opening, a plurality of elastic strips that is disposed to surround the periphery of the opening, the display panel that is disposed to close the opening via the plurality of the elastic strips, and a holding plate that is disposed to press the display panel against the plurality of the elastic strips. The case includes recesses in parts of the periphery of the opening. The plurality of the elastic strips is disposed such that each strip has a part overlapping with the corresponding part of another strip, one on another. The overlapping parts of the plurality of the elastic strips are configured to fill at least a part of the respective recesses.

DETAILED DESCRIPTION

Hereinafter, embodiments of the present disclosure will be described in detail with reference to the accompanying drawings as deemed appropriate. Note, however, that descriptions in more detail than necessary will sometimes be omitted. For example, detailed descriptions of well-known items and duplicate descriptions of substantially the same configuration will sometimes be omitted, for the sake of brevity and easy understanding by those skilled in the art.

It is noted that the present inventors provide the accompanying drawings and the following descriptions so as to facilitate fully understanding of the present disclosure by those skilled in the art. The inventors in no way intend for the present disclosure to impose any limitation on the subject matter described in the appended claims.

1. Configuration of Digital Camera 100

Figure 1:
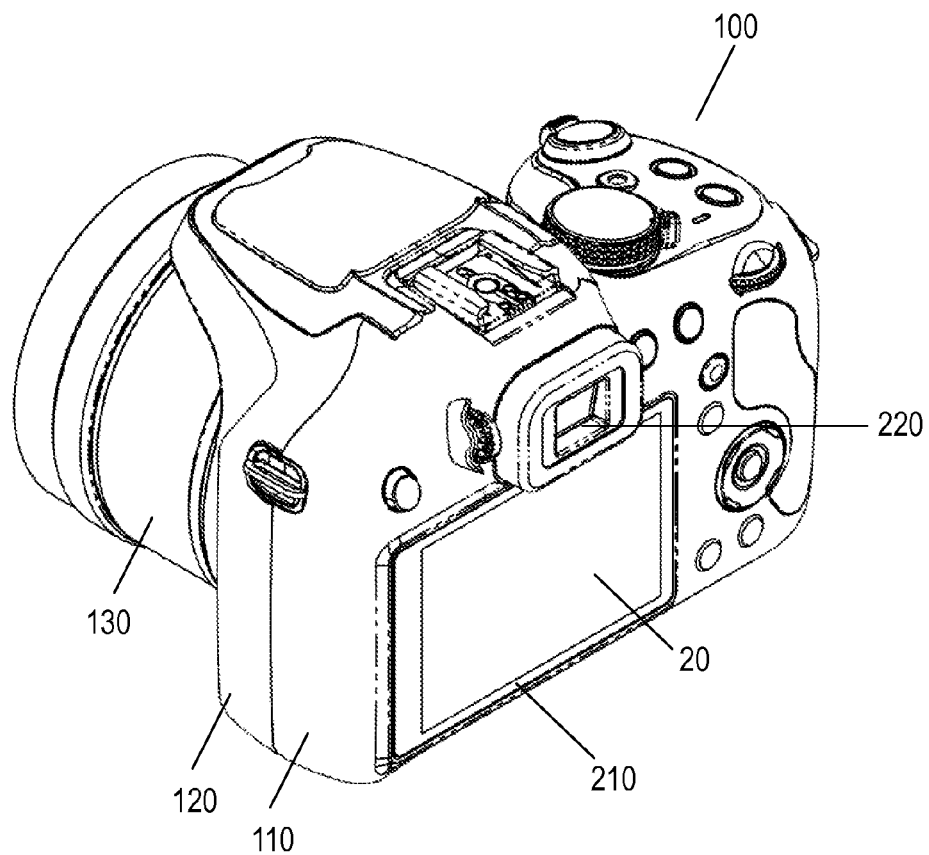
FIG. 1 is a perspective view of a digital camera.
Figure 2:
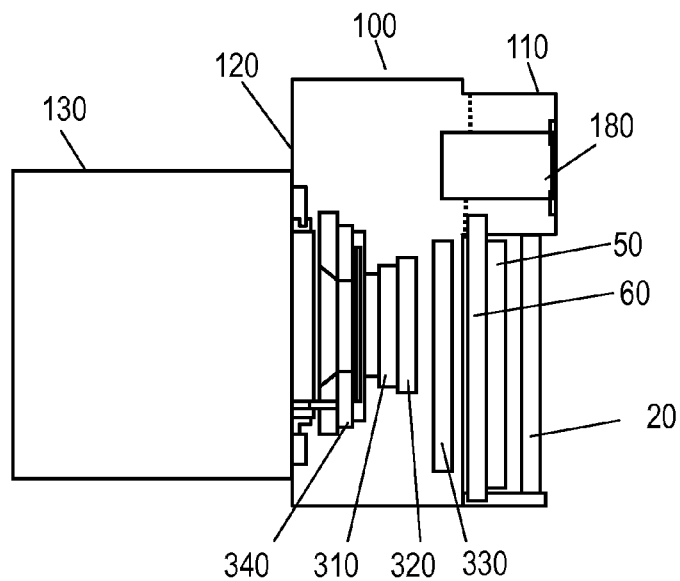
FIG. 2 is a schematic view of a configuration of the digital camera.
Figure 3:
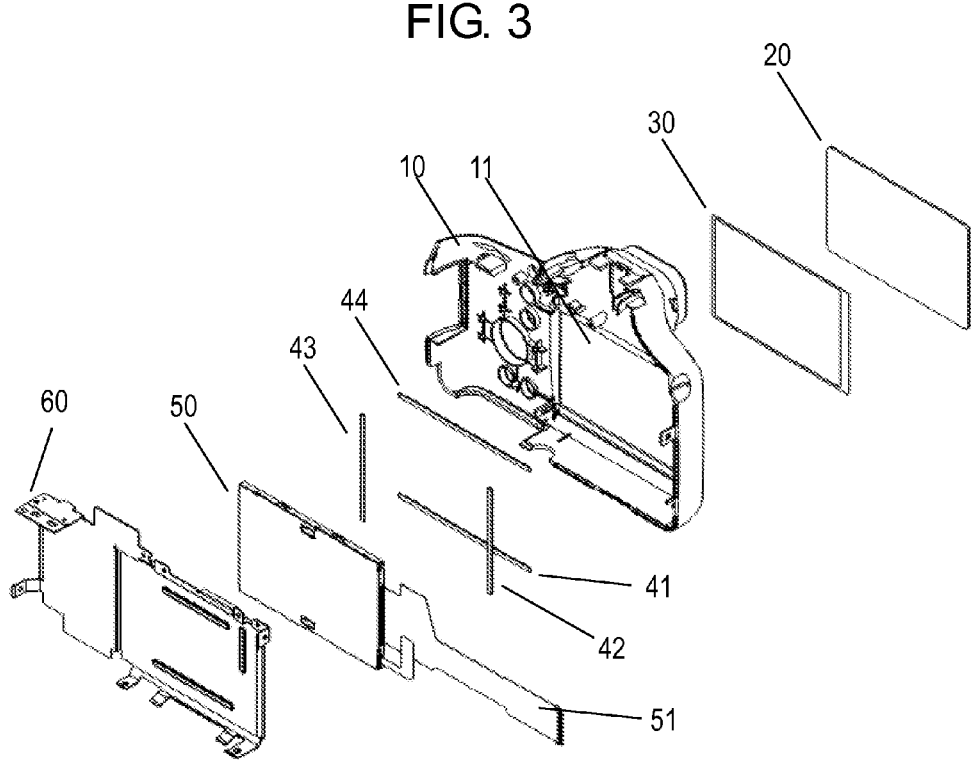
FIG. 3 is an exploded perspective view of a rear face part of the digital camera.

Hereinafter, descriptions will be made using digital camera 100 as an example. As shown in FIGS. 1 to 3, digital camera 100 includes rear unit 110, front unit 120, and lens unit 130.

Rear unit 110 is a member that configures the rear face side (the user side) of digital camera 100. Rear unit 110 includes display unit 210 and finder 220. Front unit 120 is a member that configures the front face side (the subject side) of digital camera 100. Front unit 120 includes CMOS (Complementary Metal Oxide Semiconductor) image sensor 310. Lens unit 130 is detachably attached to front unit 120. Lens unit 130 includes lenses not shown.

2. Configuration of Front Unit 120

Front unit 120 is configured mainly with shutter unit 340, CMOS image sensor 310, image-sensor control board 320, and main control board 330. Shutter unit 340 adjusts an amount of light incident on CMOS image sensor 310 via lens unit 130. CMOS image sensor 310 takes an optical image of a subject to form image data. CMOS image sensor 310 is an example of image sensors which convert the optical image into an electric signal. For the image sensor, a CCD (Charge Coupled Device) image sensor may be employed.

Image-sensor control board 320 is a circuit board which controls operation of CMOS image sensor 310. Image-sensor control board 320 may be provided with functions including a function of analog/digital conversion, and a function of processing the image data formed by CMOS image sensor 310.

Main control board 330 controls the whole of digital camera 100. Main control board 330 includes a not-shown CPU (Central Processing Unit), and not-shown memory.

3. Configuration of Rear Unit 110

As shown in FIGS. 1 to 3, rear unit 110 includes display unit 210 and finder 220. Display unit 210 is configured to display images and the like by using display panel 50. Finder 220 displays images which are the same as those displayed by display unit 210 in some cases, while displays images different from those in the other cases. Contents of the displays of both display unit 210 and finder 220 are controlled by main control board 330. Finder 220 is an electronic view finder, as an example. In the electronic view finder, a liquid crystal panel or the like is employed for the display.

As shown in FIG. 3, rear unit 110 includes rear case 10, transparent plate 20, adhesive member 30, elastic strips 41, 42, 43, and 44 (sometimes referred to as elastic strips 41-44, hereinafter), display panel 50, flexible printed circuit 51, and holding plate 60.

Figure 4:
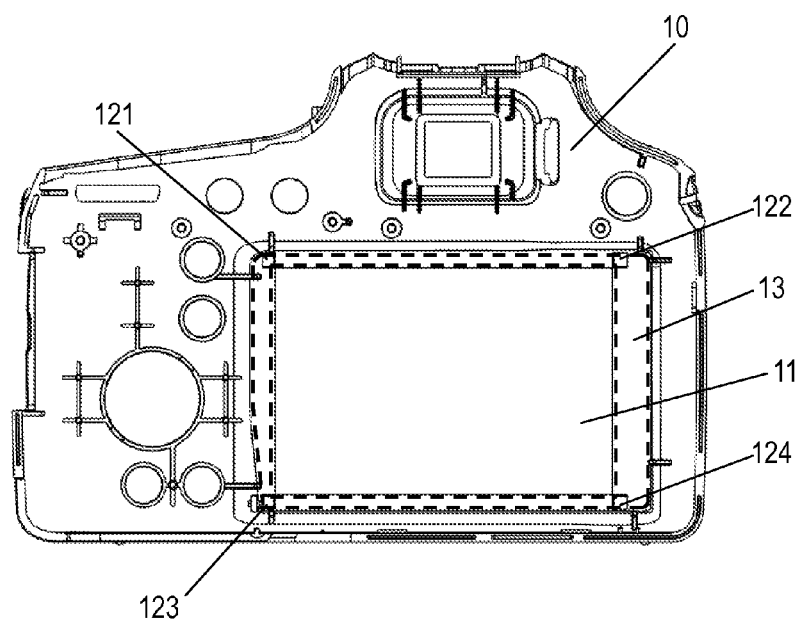
FIG. 4 is an elevational view of a rear case included in the digital camera.

As shown in FIG. 4, rear case 10 includes opening 11 with a substantially quadrangle shape. More specifically, opening 11 is substantially rectangular. Rear case 10 is configured with a molded-resin case, as an example.

Transparent plate 20 is configured with a substantially-rectangular acrylic plate, as an example. Alternatively, transparent plate 20 may be configured with a polycarbonate plate. Transparent plate 20 is disposed to close the exterior side (the user side) of opening 11. Transparent plate 20 protects display panel 50 from dust and moisture present in the surroundings. Transparent plate 20 is fixed in the exterior side of rear case 10 with frame-like adhesive member 30.

Elastic strips 41-44 are configured with substantially-rectangular urethane rubber strips, as an example. Elastic strips 41-44 are each disposed in the interior-side periphery of opening 11. Elastic strips 41-44 are disposed to surround the periphery of opening 11.

Display panel 50 is fixed to rear case 10 with holding plate 60, via elastic strips 41-44.

For display panel 50, a liquid crystal panel is employed, as an example. To display panel 50, flexible printed circuit 51 is connected which feeds signals and the like to display panel 50. In addition, a not-shown back light is disposed when the liquid crystal panel is a transmissive liquid crystal panel, while alternatively a not-shown front light is disposed when the liquid crystal panel is a reflective liquid crystal panel. For display panel 50, besides the liquid crystal panel, other devices such as an organic EL (Electroluminescence) may be employed as long as they can display images.

In the embodiment, display panel 50 is disposed in the rear side of digital camera 100. Specifically, display panel 50 is disposed in rear case 10. However, display panel 50 may be disposed at other portions of digital camera 100, such as the side surface or the top surface thereof.

Holding plate 60 is configured with a formed aluminum plate, as an example. Holding plate 60 is fixed to rear case 10 with not-shown screws, as an example. Holding plate 60 fixes display panel 50 to rear case 10, which thereby reduces entry of foreign matters onto the display screen of display panel 50.

4. Configuration of Rear Case 10

As shown in FIGS. 3 and 4 and others, rear case 10 includes opening 11 in the body thereof. Opening 11 has a substantially quadrangle shape. More specifically, opening 11 is rectangle. As shown in FIG. 4, in the interior side of rear case 10, area 13 is disposed in which display panel 50 is disposed. Area 13 is the area indicated by dashed lines in FIG. 4; that is, area 13 is the area that surrounds the circumference of opening 11.

In area 13, recesses 121, 122, 123, and 124 (sometimes referred to as recesses 121-124, hereinafter) are respectively disposed in the vicinities of the four corners of opening 11. In FIG. 4, in the vicinity of the upper left corner of opening 11, recess 121 is disposed. In the vicinity of the upper right corner of opening 11, recess 122 is disposed. In the vicinity of the lower left corner of opening 11, recess 123 is disposed. In the vicinity of the lower right corner of opening 11, recess 124 is disposed. As shown in FIG. 4, recesses 121-124 are each substantially rectangular when viewed from the front.

Figure 5:
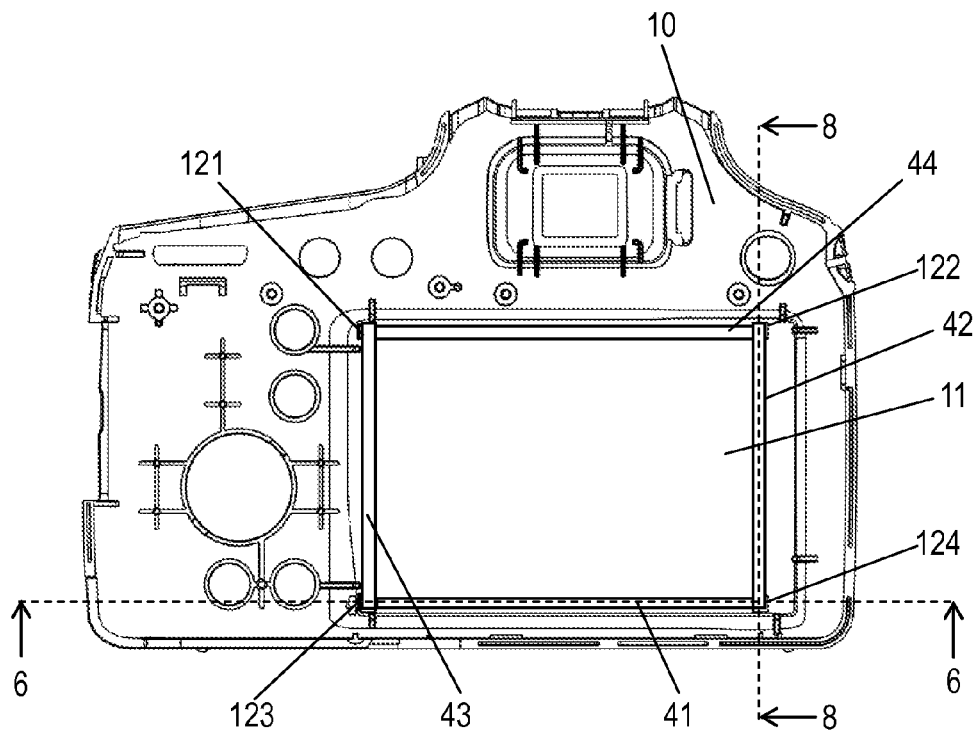
FIG. 5 is an elevational view of the rear case, illustrating the state where the case is provided with elastic strips.

As shown in FIG. 5, elastic strips 41-44 are disposed in area 13. Elastic strips 41 and 44 are respectively disposed at locations corresponding to the two long sides of opening 11. Elastic strips 42 and 43 are respectively disposed at locations corresponding to the two short sides of opening 11. That is, elastic strips 41-44 are disposed to surround the periphery of opening 11. Elastic strips 41-44 are bonded to rear case 10 with double-faced tapes not shown, as an example. Note that, as shown in FIG. 5, elastic strips 41-44 are each substantially rectangular when viewed from the front.

In FIG. 5, the right end portion of elastic strip 41 is disposed to fill at least a part of recess 124. The left end portion of elastic strip 41 is disposed to fill at least a part of recess 123. The left end portion of elastic strip 44 is disposed to fill at least a part of recess 121. The right end portion of elastic strip 44 is disposed to fill at least a part of recess 122. The upper end portion of elastic strip 43 is disposed at a location corresponding to recess 121 via the left end portion of elastic strip 44. The lower end portion of elastic strip 43 is disposed at a location corresponding to recess 123 via the left end portion of elastic strip 41. The upper end portion of elastic strip 42 is disposed at a location corresponding to recess 122 via the right end portion of elastic strip 44. The lower end portion of elastic strip 42 is disposed at a location corresponding to recess 124 via the right end portion of elastic strip 41.

Figure 6:
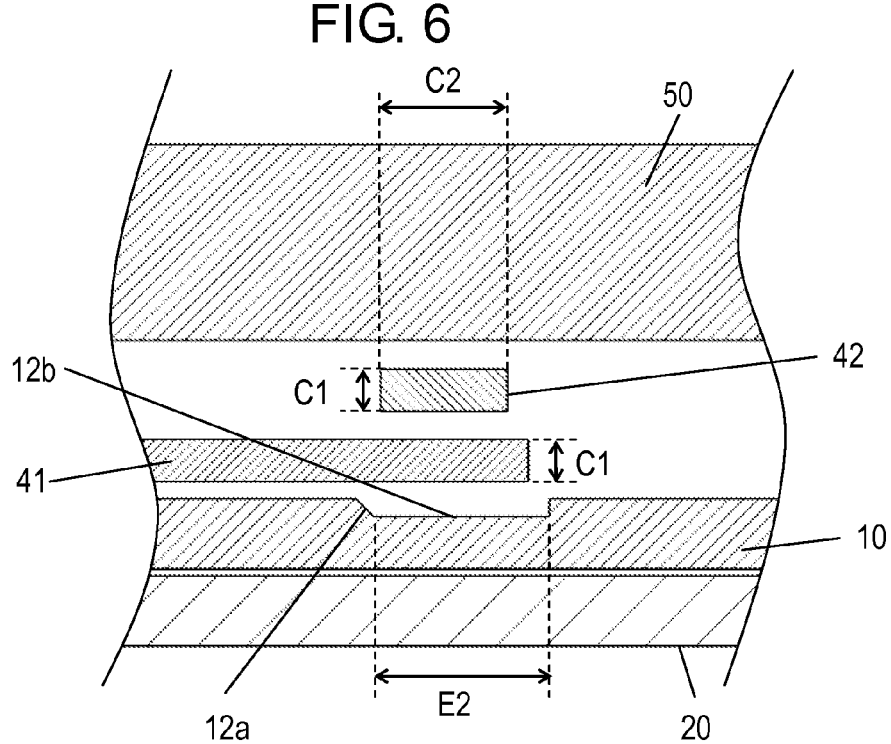
FIG. 6 is an exploded view illustrating a part of the cross section taken along line 6-6 of FIG. 5.
Figure 7:
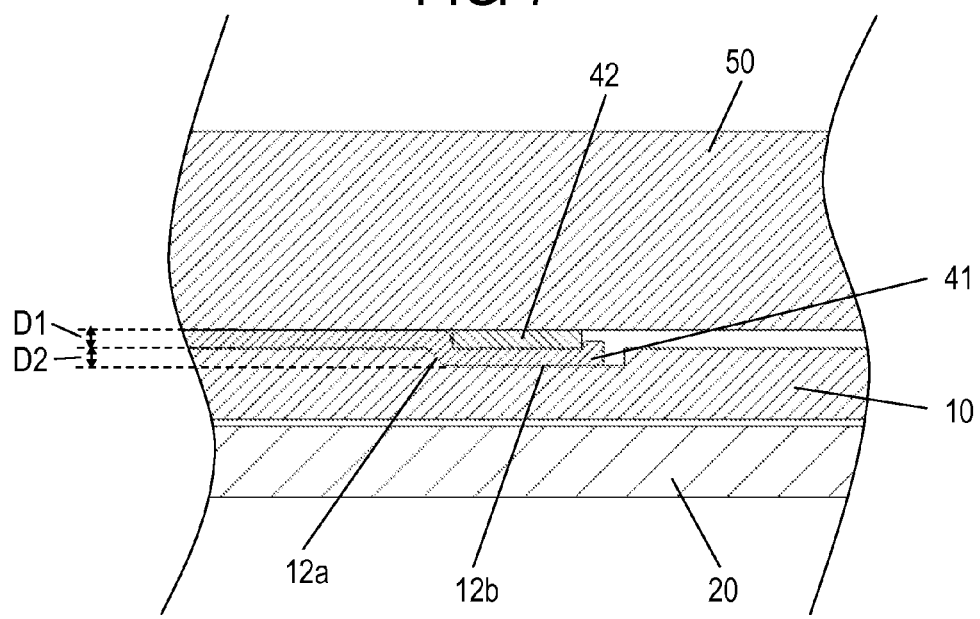
FIG. 7 is a view illustrating the part of the cross section taken along line 6-6 of FIG. 5.
Figure 8:
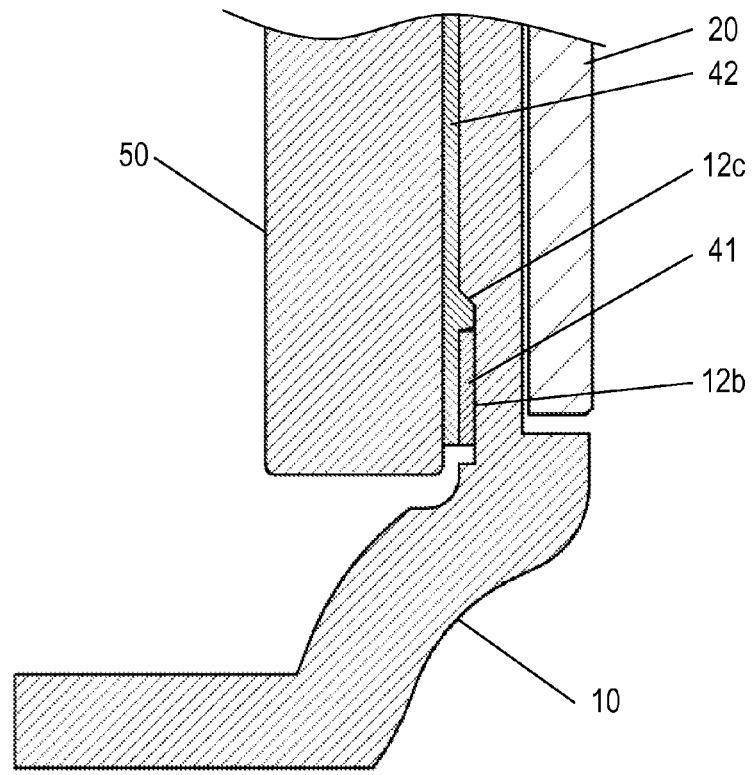
FIG. 8 is a view illustrating a part of the cross section taken along line 8-8 of FIG. 5.

As shown in FIGS. 6 to 8, recess 124 has slope 12a, bottom 12b, and slope 12c. Slope 12a inclines relative to bottom 12b. Slope 12c inclines relative to bottom 12b. Width (E2) of bottom 12b is larger than width (C2) of elastic strip 42.

As shown in FIGS. 6 and 7, elastic strips 41 and 42 are compressed in the direction of their thickness, upon being assembled. That is, from the comparison of thickness (C1) before-assembling with thickness (D1) after-assembling, it follows that C1>D1. As shown in FIG. 7, depth (D2) of bottom 12b is configured to be substantially equal to thickness (D1) of after-compressed elastic strip 41 when elastic strip 41 and elastic strip 42 are disposed to overlap with one another. Thickness (C1) of each of before-compressed elastic strips 41 and 42 is preferably larger than the sum of D1 and D2.

Although not shown in FIGS. 6 and 7, this relation holds for elastic strips 43 and 44. Each of elastic strips 41-44 may be configured using a different material from one another. However, elastic strips 41-44 are more preferably configured using the same material. This is because the same modulus of elasticity among them allows ease of designing the structure concerned.

As shown in FIG. 7, the right end portion of elastic strip 41 is disposed along slope 12a. This results in the improvement in shape followability of elastic strip 41 with respect to recess 124 because of the presence of slope 12a in recess 124. As shown in FIG. 8, in the lower end portion of elastic strip 42, a portion thereof which does not overlap with elastic strip 41 is disposed along slope 12c. The presence of slope 12c in recess 124 results in the improvement in shape followability of elastic strip 42 with respect to recess 124.

Like this, although not shown in the figures, each of recesses 121, 122, and 123 has slope 12a, bottom 12b, and slope 12c. Accordingly, pressures applied by elastic strips 41-44 to display panel 50 become more uniform. As a result, this allows reduced occurrence of problems (moiré, for example) in the display of display panel 50.

Note, however, that the positional relation of elastic strips 41-44 is not limited to the present disclosure described above. For example, the lower end portion of elastic strip 43 may be disposed to fill at least a part of recess 123. The upper end portion of elastic strip 43 may be disposed to fill at least a part of recess 121.

In this case, the left end portion of elastic strip 41 is disposed at a location corresponding to recess 123 via the lower end portion of elastic strip 43. The left end portion of elastic strip 44 is disposed at a location corresponding to recess 121 via the upper end portion of elastic strip 43.

Moreover, for example, the lower end portion of elastic strip 42 may be disposed to fill at least a part of recess 124. The upper end portion of elastic strip 42 may be disposed to fill at least a part of recess 122.

In this case, the right end portion of elastic strip 41 is disposed at a location corresponding to recess 124 via the lower end portion of elastic strip 42. The right end portion of elastic strip 44 is disposed at a location corresponding to recess 122 via the upper end portion of elastic strip 42.

5. Exemplary Variations

Elastic strips 41-44 and recesses 121-124 disclosed herein are nothing more than an example. Hereinafter, a plurality of exemplary variations will be described. Note that FIGS. 9A to 9E show the profiles of the elastic strips, positional relations between the elastic strips and the recesses, and positional relations between the elastic strips and the opening. Concerning the other configurations, descriptions and graphical illustrations thereof are omitted.

Figure 9A:
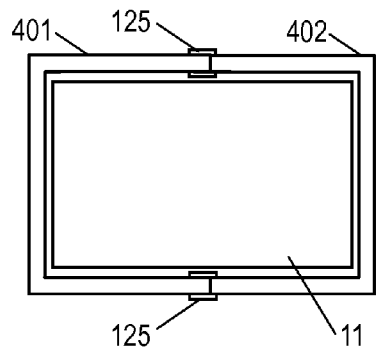
FIG. 9A is a view illustrating a positional relation between recesses and the elastic strips of a first exemplary variation thereof.

In a first variation shown in FIG. 9A, there are disposed two of elastic strips 401 and 402 each having a U-shape, and two of recesses 125. Elastic strip 401 and elastic strip 402 are disposed to overlap with one another, at the upper ends of the U-shape of each of the strips. Recess 125 is disposed in each of the two areas where elastic strip 401 and elastic strip 402 overlap with one another. Recesses 125 are disposed at locations corresponding to the long sides of opening 11. That is, in the first variation, elastic strips 401 and 402 are configured such that the bottom parts of the U-shapes of the strips are in correspondence with the respective short sides of opening 11. Note, however, that elastic strips 401 and 402 may be configured such that the bottom parts of the U-shapes are in correspondence with the respective long sides of opening 11. In this case, recesses 125 are respectively disposed at locations corresponding to the short sides of opening 11.

Figure 9D:
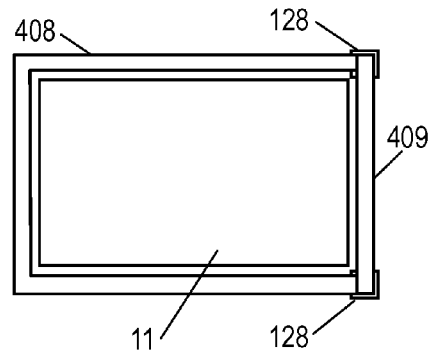
FIG. 9D is a view illustrating a positional relation between the recesses and the elastic strips of a fourth exemplary variation thereof.
Figure 9B:
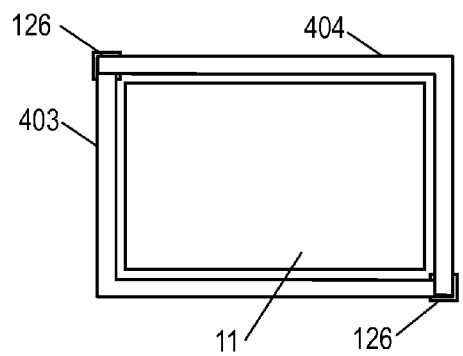
FIG. 9B is a view illustrating a positional relation between the recesses and the elastic strips of a second exemplary variation thereof.

In a second variation shown in FIG. 9B, two of elastic strips 403 and 404 each having an L-shape are disposed. The long-side end portion of elastic strip 403 is disposed to overlap with the short-side end portion of elastic strip 404. The short-side end portion of elastic strip 403 is disposed to overlap with the long-side end portion of elastic strip 404. Recess 126 is disposed in each of the two areas where elastic strip 403 and elastic strip 404 overlap with one another. Two recesses 126 are respectively disposed in the vicinities of the two diagonal corners of opening 11.

Figure 9E:
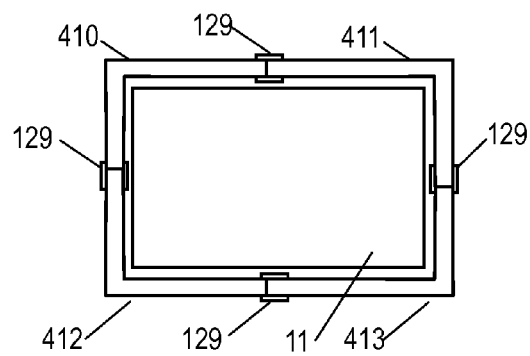
FIG. 9E is a view illustrating a positional relation between the recesses and the elastic strips of a fifth exemplary variation thereof.
Figure 9C:
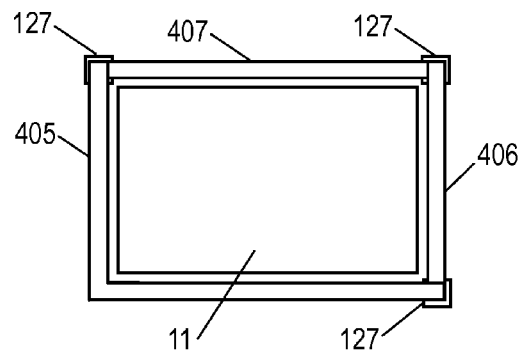
FIG. 9C is a view illustrating a positional relation between the recesses and the elastic strips of a third exemplary variation thereof.

In a third variation shown in FIG. 9C, there are disposed elastic strip 405 having an L-shape, and rectangular elastic strips 406 and 407. The long-side end portion of elastic strip 405 is disposed to overlap with one end portion of elastic strip 406. The short-side end portion of elastic strip 405 is disposed to overlap with one end portion of elastic strip 407. The other end portion of elastic strip 406 is disposed to overlap with the other end portion of elastic strip 407. Elastic strip 406 is disposed at a location opposite to the short side of elastic strip 405. Elastic strip 407 is disposed at a location opposite to the long side of elastic strip 405. Recess 127 is disposed in each of the three areas where elastic strips 405, 406, and 407 overlap with one another. Three recesses 127 are respectively disposed in the vicinities of the three diagonal corners of opening 11.

In a fourth variation shown in FIG. 9D, there are disposed elastic strip 408 having a U-shape and rectangular elastic strip 409. The upper ends of the U-shape of elastic strip 408 are respectively disposed to overlap with both end portions of elastic strip 409. In each of the two areas where elastic strip 408 and elastic strip 409 overlap with one another, recess 128 is disposed. Two recesses 128 are respectively disposed in the vicinities of the two corners located at both ends of one short side of opening 11. In the fourth variation, elastic strip 408 is configured such that the bottom part of the U-shape of the strip is in correspondence with the other short side of opening 11. Alternatively, however, the bottom part of the U-shape of elastic strip 408 may be configured to correspond to a long side of opening 11.

In a fifth variation shown in FIG. 9E, elastic strips 410, 411, 412, and 413 each having an L-shape are disposed. The short-side end portion of elastic strip 410 is disposed to overlap with the short-side end portion of elastic strip 412. The long-side end portion of elastic strip 410 is disposed to overlap with the long-side end portion of elastic strip 411. The short-side end portion of elastic strip 411 is disposed to overlap with the short-side end portion of elastic strip 413. The long-side end portion of elastic strip 412 is disposed to overlap with the long-side end portion of elastic strip 413. In each of the four areas where elastic strips 410, 411, 412, and 413 overlap with one another, recess 129 is disposed. Four recesses 129 are respectively disposed at locations corresponding to the four sides of opening 11.

Note that, in each of the variations, each of the recesses may include a bottom and a plurality of side surfaces rising from the bottom. At least one of the plural side surfaces may be a slope that inclines relative to the bottom. At least one of the elastic strips may be disposed along both the bottom and the slope.

6. Advantages

Digital camera 100 according to the present disclosure is provided with the holding structure for display panel 50 as follows. The holding structure for display panel 50 includes rear case 10 having substantially quadrangle-shaped opening 11, the plurality of elastic strips 41-44 disposed to surround the periphery of opening 11, display panel 50 disposed to close opening 11 via the plurality of elastic strips 41-44, and holding plate 60 disposed to press display panel 50 against the plurality of elastic strips 41-44. Rear case 10 includes recesses 121-124 in the respective parts of the periphery of opening 11. The plurality of elastic strips 41-44 is disposed such that the parts of the strips overlap with one another. Each of the overlapping parts of the plurality of elastic strips 41-44 is configured to fill at least a part of respective each of recesses 121-124.

In the holding structure according to the present disclosure, display panel 50 is pressed against rear case 10 by holding plate 60 via elastic strips 41-44. Therefore, display panel 50 is fixed to rear case 10. Moreover, elastic strips 41-44 are disposed such that the overlapping parts of the strips are in correspondence with respective recesses 121-124 included in rear case 10. Accordingly, the amounts of compression of elastic strips 41-44 become more uniform. This allows display panel 50 to be subjected to the more uniform pressures. For this reason, undesired substances such as foreign matters become difficult to enter a space between display panel 50 and transparent plate 20. In addition, this results in the reduction in occurrence of problems, most notably moiré, of display panel 50.

In the present disclosure, the elastic strips may employ shapes such as, for example, a substantially rectangular one, a substantially U-shaped one, and a substantially L-shaped one when viewed from the front. The plurality of the elastic strips employs a combination of these shapes. This is advantageous from a standpoint of the manufacturing cost of the elastic strips. Specifically, the elastic strips are manufactured by shape-machining of a sheet material, such as die-punching and cutting. Therefore, if one-piece of elastic strip is used which has an opening larger in size than opening 11, the shape-machining thereof will provide a smaller number of the elastic strips per unit area of the sheet material than is expected according to the present disclosure. As a result, the use of the elastic strips according to the present disclosure allows the reduced manufacturing cost of the elastic strips.

The recesses included in the holding structure for the display panel according to the present disclosure each include the bottom and the plurality of the side surfaces rising from the bottom. At least one of the plural side surfaces is a slope that inclines relative to the bottom. At least one of the plural elastic strips may be disposed along both the bottom and the slope. This configuration allows the improved shape followability of the elastic strips. As a result, the occurrence of a space between rear case 10 and display panel 50 is reduced.

In the present disclosure, the descriptions have been made using the case of, as an example, the holding structure for display panel 50 that configures display unit 210 of digital camera 100. However, the present disclosure is also applicable to a holding structure for a display panel that configures finder 220.

In the present disclosure, the descriptions have been made regarding digital camera 100, as an example. However, applicable fields of the holding structure for a display panel according to the present disclosure are not limited to the field of digital cameras. The holding structure disclosed herein is also applicable to a wide range of devices which are each provided with a display panel; they include smartphones, cellular telephones, remote-controllers for controlling devices, and liquid crystal televisions, for example.

As described above, the descriptions of the embodiments have been made as technological exemplifications of the present disclosure. To that end, the accompanying drawings and the detailed descriptions have been presented.

Moreover, it should be noted that the embodiments described above have been given solely for the purpose of exemplifying the technologies according to the present disclosure. Consequently, it is apparent that the embodiments may be subjected to various kinds of variation, replacement, addition, and omission without departing from the scope of the appended claims and the scope of their equivalents.

What is claimed is:

1. A holding structure for a display panel, the structure comprising:
   a case including a substantially quadrangle-shaped opening;
   a plurality of elastic strips, including at least a first elastic strip and a second elastic strip, for surrounding a periphery of the opening;
   the display panel for closing the opening via the plurality of the elastic strips; and
   a holding plate for pressing the display panel against the plurality of the elastic strips,
   wherein the case includes a recess in a part of the periphery of the opening, a part of each of the first and second elastic strips overlap with one another, the overlapping part of the first and second elastic strips fills at least a part of the recess, and the overlapping part includes opposing faces of the elastic strips overlapped with one another, wherein the opposing faces are parallel to a plane of the display panel.

2. The holding structure for the display panel according to claim 1, wherein the case includes the recess in a vicinity of a corner of the opening.

3. The holding structure for the display panel according to claim 1, wherein the case includes the recess in a vicinity of each of the four corners of the opening.

4. The holding structure for the display panel according to claim 3, wherein the plurality of the elastic strips are substantially rectangular.

5. An imaging device comprising:
   the holding structure for the display panel according to claim 4; and
   an image sensor,
   wherein the display panel displays an image taken by the image sensor.

6. The imaging device according to claim 5, wherein a thickness of the first elastic strip before being assembled to the holding structure is greater than the depth of a bottom of the recess.

7. The holding structure for the display panel according to claim 1, wherein the recess includes a bottom and a plurality of side surfaces rising from the bottom, at least one of the plurality of the side surfaces is a slope inclining relative to the bottom, at least one of the plurality of the elastic strips is disposed along the bottom and the slope.

8. The holding structure for the display panel according to claim 1, wherein the plurality of the elastic strips are substantially rectangular.

9. An imaging device comprising:
   the holding structure for the display panel according to claim 1; and
   an image sensor,
   wherein the display panel displays an image taken by the image sensor.

10. The imaging device according to claim 9, wherein a thickness of the first elastic strip before being assembled to the holding structure is greater than the depth of a bottom of the recess.

11. The holding structure for the display panel according to claim 1, wherein the overlapping part of the elastic strips is compressed together when the holding plate presses the display panel against the plurality of elastic strips.

12. The holding structure for the display panel according to claim 1, wherein a thickness of the first elastic strip before being assembled to the holding structure is greater than the depth of a bottom of the recess.

* * * * *